P. T. PARKER.
PROCESS OF CURING SWEET POTATOES.
APPLICATION FILED SEPT. 17, 1912.

1,051,755.

Patented Jan. 28, 1913.

Witnesses
W. H. Mulligan.
C. C. Hines.

Inventor
Phillip T. Parker
By Victor J. Evans
Attorney

UNITED STATES PATENT OFFICE.

PHILLIP T. PARKER, OF McKENZIE, ALABAMA.

PROCESS OF CURING SWEET POTATOES.

1,051,755.  Specification of Letters Patent.  Patented Jan. 28, 1913.

Application filed September 17, 1912. Serial No. 720,889.

*To all whom it may concern:*

Be it known that I, PHILLIP T. PARKER, a citizen of the United States, residing at McKenzie, in the county of Butler and State of Alabama, have invented new and useful Improvements in Processes of Curing Sweet Potatoes, of which the following is a specification.

This invention relates to a process of curing sweet potatoes, the object of the invention being to provide a process of treatment whereby the potatoes may be cured and rendered capable of resisting frost and of being kept in perfect condition for a long period, without in any manner eliminating the saccharine constituents of the potatoes or impairing their taste or flavor, but on the contrary with the result of improving their texture and edible qualities.

A further object of the invention is to provide a process of treatment whereby potatoes partially frosted before being harvested or bruised or otherwise injured may be cured and preserved and decay arrested.

Figure 1:
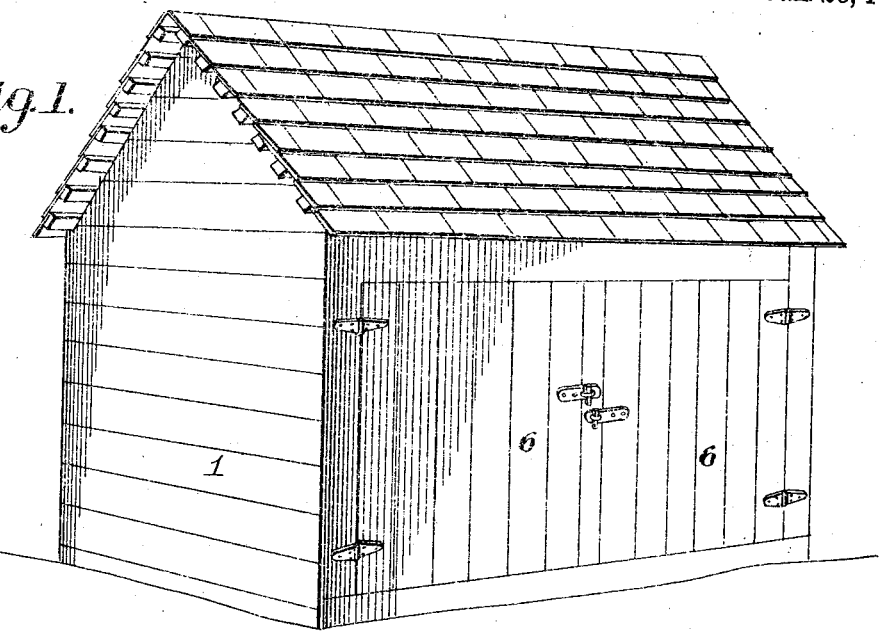
Figure 2:
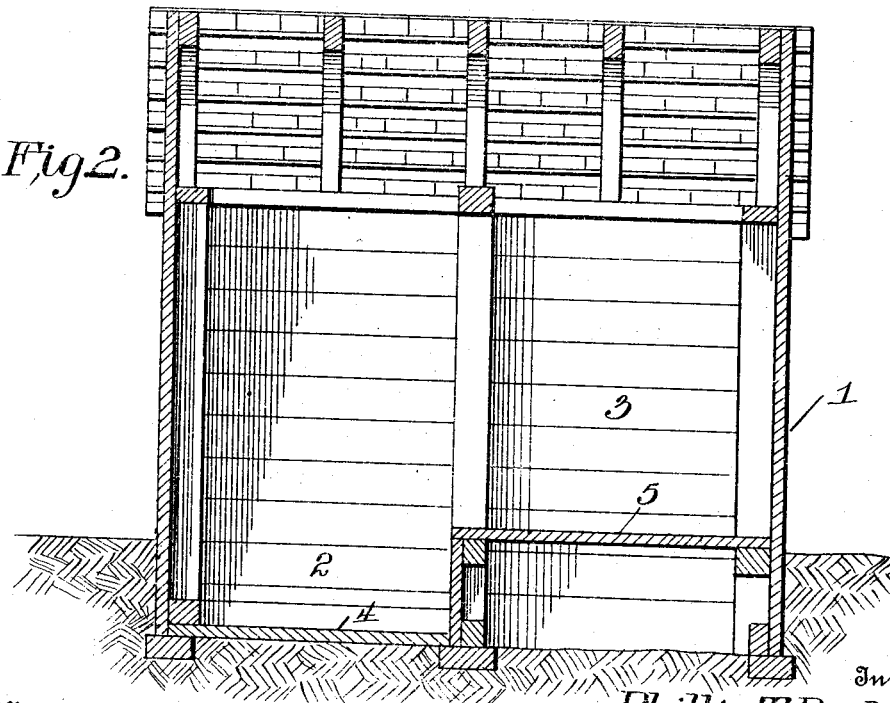

In the accompanying drawing, showing a form of building or inclosure preferably employed in carrying out the process,—Figure 1 is a perspective view of the building or inclosure, and Fig. 2 is a vertical transverse section of the same.

As shown in the drawing, the building or inclosure 1 is provided with a storage compartment 2 and a curing compartment 3, the floor 4 of the compartment 2 preferably being arranged below the level of the floor 5 of the compartment 3. In practice the building or inclosure may be supported upon a suitable foundation so that the base of the compartment 2 lies below the level of the ground surface, while the floor 5 of the compartment 3 is arranged substantially level with the ground surface. The building is constructed of any suitable material or in any suitable manner to exclude moisture and maintain a uniform temperature therein, and access thereto is afforded through one or more doors 6 communicating directly with the compartment 3, which in practice is arranged to face the sun so that when the doors are open the said compartment 3 will be exposed for the admission to a maximum degree of air and sunlight.

The potatoes to be cured are laid in a pile or heap upon the floor 5, and at sunrise each day the doors 6 are opened to allow the sun and air to have free access to the potatoes. At nightfall, or when it rains during the day, the doors are closed to prevent chilling of the potatoes or their absorption of moisture and to maintain them at a uniform temperature. When the building or inclosure is sealed by the closing of the doors, the temperature at which the potatoes are kept causes them to sweat or exude a portion of their moisture, which, when the potatoes are next exposed to air and sunlight, is evaporated. The steps of successively sealing the potatoes within an inclosure to protect and cause them to sweat, and of exposing them to air and sunlight for the purpose of evaporating the moisture, are carried out until all the moisture in the potatoes is eliminated, which may be determined by the absence of sweat upon the skins of the potatoes after they have been confined for a predetermined period, whereupon the potatoes may be stored in the compartment 2 or in any other suitable storage receptacle for future use or sale.

In carrying on the process, the potatoes are for convenience sealed during the night and exposed during the day, but it will of course be understood that, as the gradual elimination of the moisture from the potatoes is important, the doors may be left partially open during the night or partially closed during the day to prevent excessive sweating or evaporation, care being taken to bring the moisture uniformly to the surface of the vegetable and in such quantity as to be evaporated upon the subsequent exposure of the potatoes to air and sunlight, thus obviating all liability of excessive or imperfect drying out of the moisture, or the external presence of sufficient moisture liable to cause rot. In good weather, the process of treatment requires on an average about fifteen days.

It has been found that through this process of sweating the potatoes gradually and evaporating the moisture by air and sunshine between successive stages of the sweating action, the moisture is gradually drawn from the body of the vegetable to the surface and finally eliminated. In its flow to the surface, the moisture which carries the saccharine matter with it, uniformly distributes the latter throughout the body of the vegetable until finally, at the last stage of treatment, a residual amount of the moisture is left present with enough saccharine matter to form a gummy mass which fills and seals the pores of the skin against the access of moisture, thus placing the potato in a condition for preservation for an indefinite period without deterioration. This mode of treatment requires the use of air and sunshine, and the periodical sweating of the vegetable to a slight extent, as otherwise the vegetable is liable to be dried too rapidly, with a consequent expulsion of a portion of its saccharine matter and consequent deterioration of quality, or to be unevenly or imperfectly dried so that the vegetable is liable to rot or its keeping and edible qualities are otherwise impaired. Sweet potatoes treated according to the present process have been preserved without deterioration of any character for a period of a year, and it has been determined that the texture of the body of the vegetable is considerably improved and its flavor and taste enhanced, due probably to a chemical change which ensues whereby the hard fibrous constituents are softened and a greater delicacy of texture secured. Practical experiments have shown that these results cannot be obtained by any process of treatment in which the vegetable is subjected to artificial heat or to constant exposure in the sun and air.

Potatoes thus treated are not affected by ordinary climatic changes or liable to be frost bitten under ordinary low temperature. The process of treatment also arrests decay where the potatoes have been partially frost bitten before harvesting or bruised or otherwise injured.

I claim:—

1. The herein described process of curing sweet potatoes, which consists in successively confining and sweating the potatoes and exposing the same, between such sweating periods, to sunshine and air to evaporate the exuded moisture.

2. The herein described method of curing sweet potatoes, which consists in confining a body of potatoes in an inclosure capable of being sealed or of being opened to air and sunshine, sealing said inclosure periodically to sweat the potatoes, opening said compartment after each sweating action to expose the potatoes to air and sunshine for evaporation of the moisture, and alternately carrying out such steps until the potatoes cease to sweat.

In testimony whereof I affix my signature in presence of two witnesses.

PHILLIP T. PARKER.

Witnesses:
E. A. BUNORD,
E. D. ESPEY.

Copies of this patent may be obtained for five cents each, by addressing the "Commissioner of Patents, Washington, D. C."